United States Patent
Huang et al.

(10) Patent No.: US 8,233,729 B2
(45) Date of Patent: Jul. 31, 2012

(54) METHOD AND APPARATUS FOR GENERATING CODED BLOCK PATTERN FOR HIGHPASS COEFFICIENTS

(75) Inventors: Chao-Tsung Huang, Kaohsiung (TW);
Chia-Ping Lin, Kaohsiung (TW)

(73) Assignee: Novatek Microelectronics Corp., Hsinchu (TW)

( * ) Notice: Subject to any disclaimer, the term of this patent is extended or adjusted under 35 U.S.C. 154(b) by 814 days.

(21) Appl. No.: 12/368,275

(22) Filed: Feb. 9, 2009

(65) Prior Publication Data
US 2009/0238481 A1    Sep. 24, 2009

(30) Foreign Application Priority Data

Mar. 21, 2008    (TW) ............................... 97110116 A

(51) Int. Cl.
*G06K 9/36*    (2006.01)

(52) U.S. Cl. ..................................... 382/232

(58) Field of Classification Search .......... 382/232–233, 382/238–240, 242, 248, 250; 348/384.1, 348/394.1–395.1, 400.1–404.1, 407.1–416.1, 348/420.1–421.1, 425.1, 430.1–431.1; 341/51, 341/63, 65, 67, 107; 375/240.11, 240.15, 375/240.16, 240.18; 708/203, 300, 313, 708/314, 316, 317, 318, 400–405, 409

See application file for complete search history.

(56) References Cited

U.S. PATENT DOCUMENTS

| | | | |
|---|---|---|---|
| 7,305,139 B2 * | 12/2007 | Srinivasan et al. | 382/248 |
| 7,471,850 B2 * | 12/2008 | Srinivasan | 382/276 |
| 7,933,337 B2 * | 4/2011 | Srinivasan et al. | 375/240.18 |
| 2006/0093226 A1 | 5/2006 | Gormish et al. | |
| 2007/0036222 A1 | 2/2007 | Srinivasan et al. | |
| 2007/0036224 A1 | 2/2007 | Srinivasan et al. | |
| 2007/0036443 A1 | 2/2007 | Srinivasan | |

FOREIGN PATENT DOCUMENTS

| | | |
|---|---|---|
| CN | 1805547 | 7/2006 |
| CN | 1965321 | 5/2007 |
| TW | 200806037 | 1/2008 |

OTHER PUBLICATIONS

"Office Action of Taiwan Counterpart Application", issued on Aug. 30, 2011, p. 1-p. 6, in which the listed references were cited.

* cited by examiner

*Primary Examiner* — Jose Couso
(74) *Attorney, Agent, or Firm* — Jianq Chyun IP Office

(57) ABSTRACT

A method and an apparatus for generating a coded block pattern for highpass coefficients are provided. The method includes receiving a quantized highpass coefficient (HP), wherein the HP includes a macroblock data; dividing the macroblock into a plurality of blocks; performing lapped transform (LT) operations of two stages on the said block data, concurrently calculating a plurality of coded block patterns of the blocks corresponding to all possible HP prediction directions; performing a calculation to obtain selection information of the HP prediction directions according to lowpass coefficients (LPs) generated through LT operations of the two stages; selecting a corresponding coded block pattern among the said coded block patterns according to the abovementioned selection information of the HP prediction directions and outputting the selected coded block pattern.

13 Claims, 5 Drawing Sheets

METHOD AND APPARATUS FOR GENERATING CODED BLOCK PATTERN FOR HIGHPASS COEFFICIENTS

CROSS-REFERENCE TO RELATED APPLICATION

This application claims the priority benefit of Taiwan application serial no. 97110116, filed on Mar. 21, 2008. The entirety of the above-mentioned patent application is hereby incorporated by reference herein and made a part of specification.

BACKGROUND OF THE INVENTION

1. Field of the Invention

The present invention generally relates to a method and an apparatus for generating a coded block pattern for highpass coefficients, and more particularly, to a method and an apparatus for generating a coded block pattern for highpass coefficients capable of reducing the number of operation clock cycles and the number of coefficient accesses.

2. Description of Related Art

An image compression coding is usually implemented by transforming and compression encoding a raw image data to generate an encoded stream, where the image compression coding procedure also includes performing sampling and color space transforming.

Taking the JPEG format standard as an example, the image compression coding procedure includes transforming the colors of a raw image data onto the YCbCr color space, performing discrete cosine transform (DCT), quantization processing, performing prediction difference on the DC coefficients, scanning the coefficients into a run-length encoded data in zig-zag scan sequence and finally performing variable length coding to complete encoding the above-mentioned JPEG data.

The Microsoft Co. in WA, US has designed a new still-image compression file format, termed as HD Photo format. The JPEG International Standard committee has considered Microsoft's HD Photo format as a new standard called JPEG XR. In order to reduce the block effect introduced by an independence block transform, the HD Photo format adopts lapped transform (LT) scheme based on a 4×4 block as an unit, wherein an overlap filtering is performed on the 4×4 blocks located at the common boundaries between blocks, followed by performing core transform on the 4×4 blocks. The overlap filtering and the core transform herein utilize a lifting scheme to ensure a lossless compression. After the LT, a quantization processing and a coefficient-predicting procedure are performed to generate a coded block pattern. After the coded block pattern is generated, adaptive scanning and entropy coding are carried out to generate an encoded stream.

Every step of the above-mentioned image-lifting architecture is entirely reversible. Therefore, if the coding procedure is performed on a lossless compression transform signal, it is allowed to perform a reversible core transform during decoding first, followed by a reversible overlap filtering. As a result, an identical picture with the original one can be obtained. The HD Photo format allows people to self-determine whether to perform an overlap filter transform of the first stage and an overlap filter transform of the second stage. The obtained DC coefficients and AC coefficients are quantized, and then the entropy coding and a packetization processing are performed on the quantized coefficients such that a compressed bit stream can be obtained.

The specification of the HD Photo format has considerable differences from the JPEG format. In particular, the HD Photo format allows a pixel value domain having a larger range, uses a newly-defined YCoCg color space, a newly-defined lapped-transforms of two stages and a newly-defined coefficient prediction operation.

Prior to perform the entropy coding on the transform coefficients, a block pattern coding needs to be carried out first. However, the coded block pattern is the information indicating that whether the normalized coefficients of each meta-block are all zoro, where the normalized coefficients are generated by quantizing, coefficient predicting and then normalizing the coefficients of the metablock. Furthermore, after performing the transform and the quantization, a coefficient prediction and a normalization and then extracting the coded block pattern information are performed. Only finishing the above-mentioned steps, an entropy coding on the coefficients can be performed. It is obvious that the operation of calculating the coded block pattern would increase the number of operation clock cycles and the burden for a memory to be accessed.

FIG. 1 is block diagram showing a compression coding flowchart of a still-image in HD Photo format. Referring to FIG. 1, after performing a color transform of an image, a lapped transform operation of the first stage 110 and a lapped transform operation of the second stage 120 are performed on the image, wherein the calculating results of the lapped transform operation of the first stage 110 are inputted into the lapped transform operation of the second stage 120. Then, the DC coefficients (shortly termed as 'DC'), lowpass coefficients (shortly termed as 'LP') and highpass coefficients (shortly termed as 'HP') are generated according to the two-stage lapped transform. Thereafter, quantization operations 130, 132 and 134 are performed respectively on the DCs 122, the LPs 124 and the HPs 126; after that, a DC prediction direction operation 140, an LP prediction direction operation 142 and a HP prediction direction operation 144 are performed. Then, an entropy coding operation 150 is performed according to the results of 140, 142 and 144, wherein the entropy coding operation 150 includes coefficient normalization, adaptive scan, variable length coding, etc.

FIG. 2 is a diagram illustrating the coefficients of a macroblock of an image data in YUV_4:4:4 format are obtained by using transform, quantization and coefficient prediction. Referring to FIG. 2, a macroblock 210 herein represents an Y (luma) macroblock, a U (chroma) macroblock or a V (chroma) macroblock. A transform of the first stage on the macroblock 210 is performed and then 16 metablocks 220 are obtained, wherein each metablock includes one DC 222 and 15 HPs 224. Then, the 16 DCs obtained in the transform of the first stage are arranged to compose a 4×4 block. After that, an LT of the second stage on the 4×4 block is performed so as to obtain a new block 230, wherein the block 230 consists of one DC 232 and 15 LPs 234. In terms of the LTs on a macroblock of an image data in YUV_4:2:2 format or YUV_4:2:0 format, the procedures are similar to that of FIG. 2.

Prior to performing an entropy coding on HPs however, the coded block pattern thereof must be obtained. A coded block pattern for HPs of YUV_4:4:4 format has 48 bits in total, wherein each bit respectively represents one of the 16 metablocks of an Y macroblock, the 16 metablocks of a U macroblock and the 16 metablocks of a V macroblock. The bit value '0' herein means all the HPs of a metablock after performing the quantization, the coefficient prediction and the normalization are all-zero; otherwise, the bit value is '1'.

The coefficient prediction direction utilizes the above-mentioned macroblock as a unit. The DC prediction direction of a macroblock is decided by the DC values of the macroblock at the left edge, the upper-left corner and the upper edge. The LP prediction direction of a macroblock is decided by the DC prediction direction and the quantization parameter. In other words, the DC prediction direction and the LP prediction direction can be decided prior to the LT on the same macroblock. In contrast, the HP prediction direction is obtained after calculating the LPs of the same macroblock; however, the LPs are obtained after performing the transform of the second stage, which is shown in FIG. 3, after the transform of the second stage, a HP prediction direction is calculated with the LPs and then the HPs are extracted to calculate the coded block pattern for HPs. In FIG. 3, after performing the LTs 310 of the two stages, the generated LPs are used to calculate the HP prediction direction 320, then calculate the coded block pattern 330 for HPs and finally perform an entropy coding 340 on the HPs.

Such an architecture would increase the number of operation clock cycles and the number of coefficient accesses, which reduces the efficiency of processing data.

SUMMARY OF THE INVENTION

The present invention is directed to a method and an apparatus for generating a coded block pattern for highpass coefficients capable of reducing the number of operation clock cycles and the number of coefficient accesses.

In an embodiment, the present invention provides a method for generating a coded block pattern for highpass coefficients. A quantized highpass coefficient (HP) is received. The HP includes a macroblock data, and the macroblock is divided into a plurality of blocks. A plurality of two-stage lapped transform (LT) operations are performed on the block data and a plurality of coded block patterns of the blocks corresponding to all possible HP prediction directions is concurrently calculated. A calculation is performed to obtain selection information of the HP prediction directions according to lowpass coefficients (LPs) generated through the two-stage LT operations. A corresponding coded block pattern is selected among the said coded block patterns according to the above-mentioned selection information of the HP prediction directions and outputting the selected coded block pattern.

In the above-mentioned method for generating a coded block pattern for highpass coefficients, the operation of calculating the coded block patterns of the block data includes obtaining a set of HP normalization parameters of the macroblock; calculating the numbers of non-zero coefficients of the set of HP normalization parameters corresponding to the said HP prediction directions so as to generate a plurality of data of numbers of non-zero coefficients; then, receiving the data of the numbers of non-zero coefficients and generating the coded block patterns corresponding to the HP prediction directions.

In the above-mentioned method for generating a coded block pattern for highpass coefficients, the set of HP normalization parameters of the macroblock is generated based on the set of HP normalization parameters of a previous macroblock and the set of numbers of non-zero HPs of the macroblock.

In the above-mentioned method, the method of generating the set of numbers of non-zero HPs of the macroblock includes accumulating the plurality of block data the macroblock contains; obtaining a plurality of numbers of non-zero coefficients corresponding to the highpass coefficient prediction directions and selecting one of the block data as the set of numbers of non-zero highpass coefficients of the macroblock according to the selection information.

The above-mentioned macroblock is subject to YUV_4:4:4 format, where the HP prediction directions include a prediction from top, a prediction from left and a null prediction. In addition, the above-mentioned processing is similar for YUV_4:2:2 format and YUV_4:2:0 format as well.

In an embodiment, the present invention provides an apparatus for generating a coded block pattern for highpass coefficients. The apparatus includes a generator, a coded block pattern generator, a coded block pattern buffer and a decision circuit. The generator for generating numbers of non-zero coefficients of blocks by receiving the quantized HPs and the normalization parameter. The quantized HPs include a macroblock data, and the macroblock is further divided into a plurality of blocks. The generator is used to calculate numbers of non-zero coefficients in the normalized HPs corresponding to a plurality of HP prediction directions of the above-mentioned blocks. The coded block pattern generator receives the numbers of non-zero coefficients corresponding to all the possible highpass coefficient prediction directions so as to generate coded block patterns corresponding to different highpass coefficient prediction directions. The coded block pattern buffer is used to register the coded block patterns corresponding to the HP prediction directions of the blocks. The decision circuit receives the quantized LPs, generates a selection signal of the HP prediction directions, and selects the corresponding HP coded block pattern registered in the coded block pattern buffer according to the selection signal of the HP prediction directions for output.

The apparatus further includes an accumulator accumulating the numbers of non-zero coefficients in the HPs of all the blocks of the macroblock after normalizing the highpass coefficient prediction directions, generating thereby a plurality of sets of corresponding numbers of non-zero highpass coefficient coefficients and selecting one of the sets of numbers, according to the selection signal of highpass coefficient prediction directions for output.

The above-described apparatus for generating a coded block pattern for highpass coefficients further includes a normalization parameter generator, which receives the set of numbers of non-zero HPs selected, generates a set of HP normalization parameters for the successive macroblock according to the set of HP normalization parameters and the set of numbers of non-zero HPs of the macroblock and outputs the generated set of HP normalization parameters for the successive macroblock as the base for the generator to calculate the non-zero HP coefficients.

The above-mentioned macroblock data is subject to YUV_4:4:4 format, and the HP prediction directions include a prediction from top, a prediction from left and a null prediction. In addition, the processing is similar for YUV_4:2:2 format and YUV_4:2:0 format as well.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
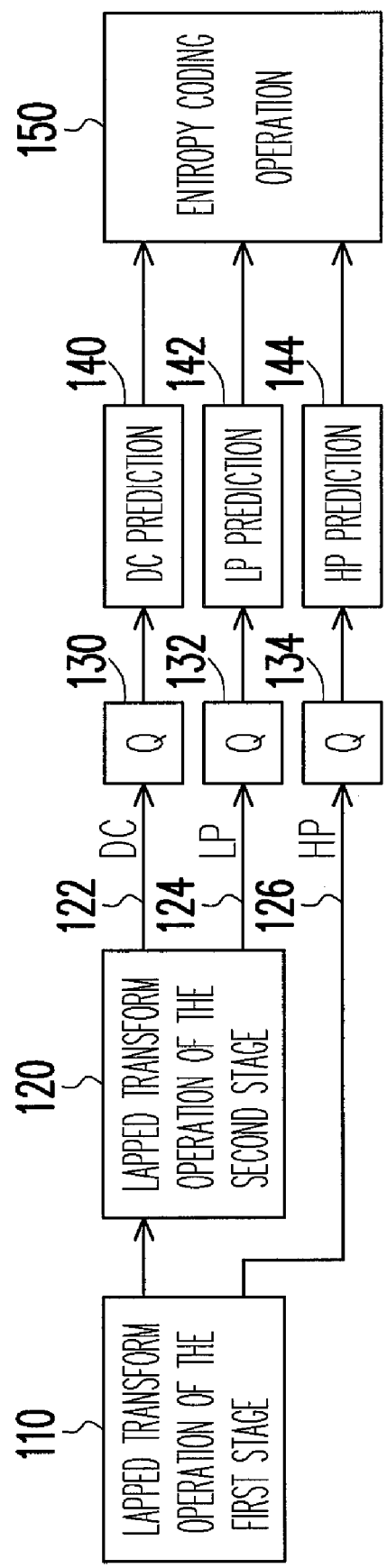
FIG. 1 is block diagram showing a compression coding flowchart of a still-image in HD Photo format.

Reference will now be made in detail to the present preferred embodiments of the invention, examples of which are illustrated in the accompanying drawings. Wherever possible, the same reference numbers are used in the drawings and the description to refer to the same or like parts.

The present invention provides a method for generating a coded block pattern for highpass coefficients and a hardware apparatus thereof to realize coding an image in HD Photo format with a high processing efficiency.

In terms of the block pattern coding technique, the disclosure of the related coding technique in the US patent application No. 20070036222 can be referred, where the coding involves introductions of block patterns and spatial predictions, etc. A block pattern is a type of symbol inserted in a compressed bitstream by a encoder for indicating which of the metablocks in a previously defined cluster can be skipped to encode because all the coefficients of the blocks are zero and for indicating which of the metablocks are not skipped.

Figure 2:
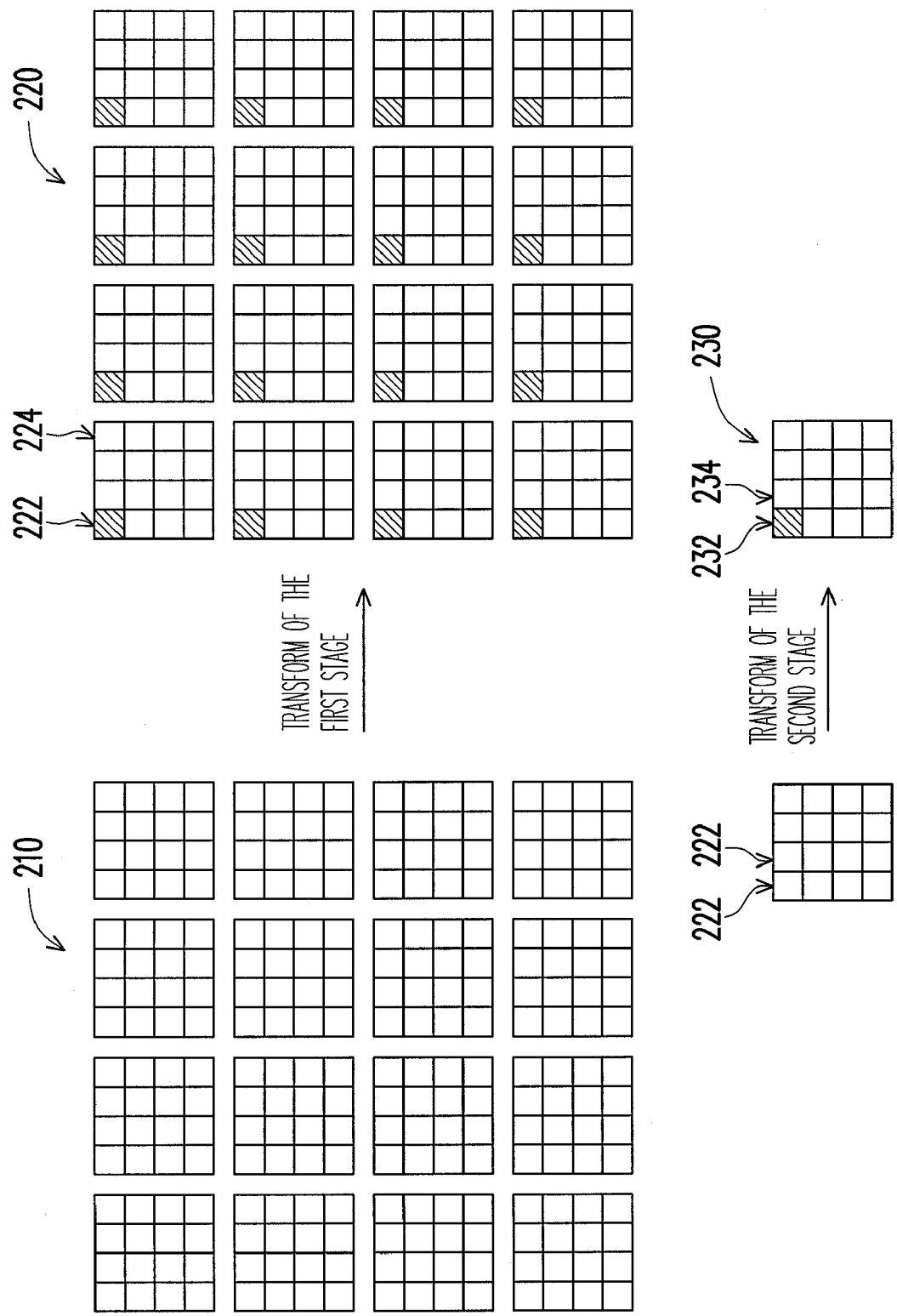
FIG. 2 is a diagram illustrating the coefficients of a macroblock of an image data in YUV_4:4:4 format are obtained by using transform, quantization and coefficient prediction.
Figure 3:
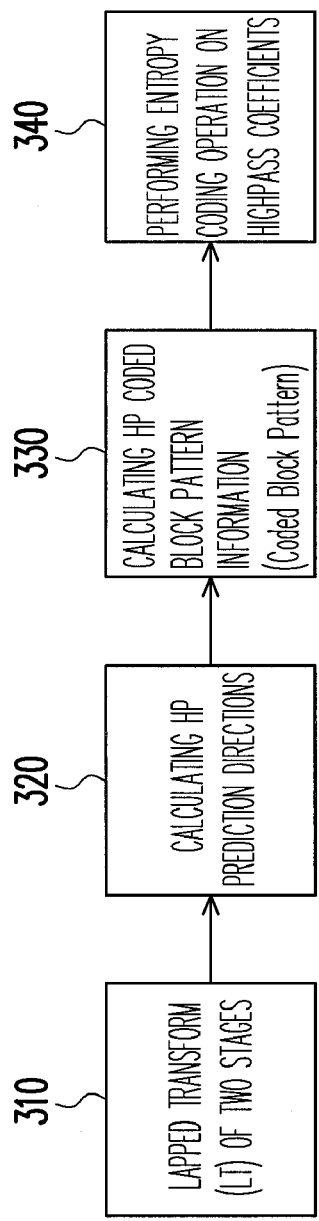
FIG. 3 is a schematic flowchart showing a block pattern coding for highpass coefficients and an entropy coding in the prior art.

The above-mentioned cluster usually means a macroblock. In terms of a YUV_4:4:4 format for example, in a YUV color space, Y represents luminance (shortly termed as 'luma'), i.e. graylevel value; U and V represent chrominance (shortly termed as 'chroma'). As shown in FIG. 2, in a YUV color space, a macroblock on the Y luminance plane has 16 metablocks and each metablock has 4×4 coefficients. Therefore, there are 16 block patterns in total, which are 16 symbols respectively corresponding to the 16 metablocks.

In terms of YUV_4:4:4 format, the different planes have 48 metablocks in total, wherein each 16 metablocks are respectively corresponding to the Y plane, the U plane and the V plane; in terms of YUV_4:2:2 format, the different planes have 32 metablocks in total, i.e., Y+U+V=16+8+8=32; in terms of YUV_4:2:0 format, the different planes have 24 metablocks in total, i.e., Y+U+V=16+4+4=24. Thus, different color formats have different numbers of metablocks depending on the specific and different applications. Note that the method for generating a coded block pattern for highpass coefficients provided by the present invention is applicable to different color formats and not limited to a specific format; but for convenience, the following description targets YUV_4:4:4 format.

Figure 4:
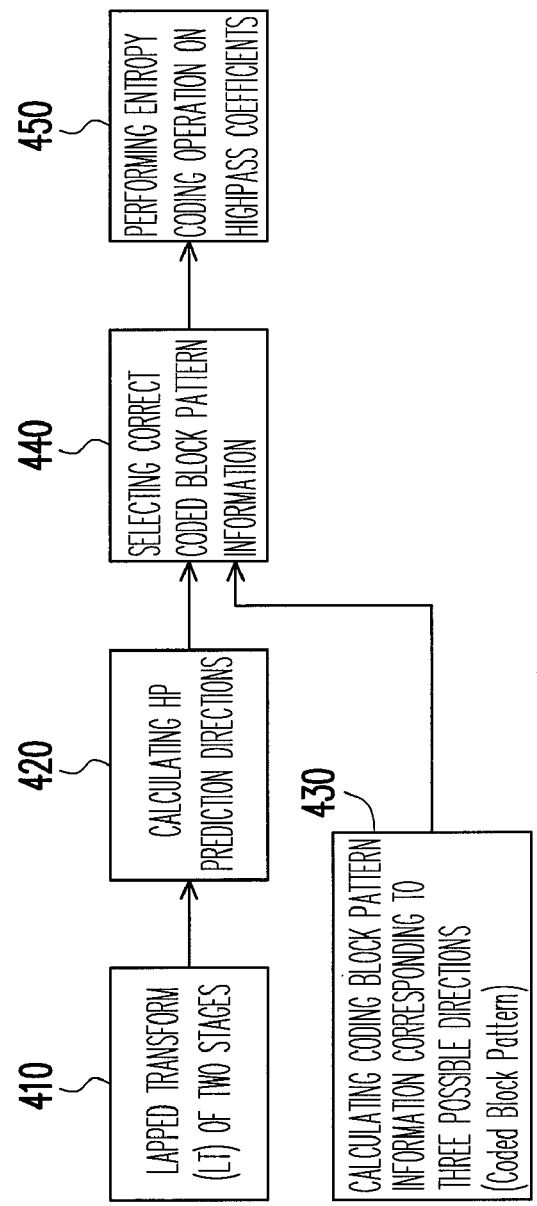
FIG. 4 is a schematic flowchart showing a block pattern coding for highpass coefficients and an entropy coding according to an embodiment of the present invention.

FIG. 4 is a schematic flowchart showing a block pattern coding for highpass coefficients according to an embodiment of the present invention. In order to obtain coded block patterns for highpass coefficients (HPs), in step 410, two-stage transforms are performed. Step 430 is conducted concurrently with step 410. In step 430, a plurality of numbers of non-zero normalized HPs of the metablocks corresponding to a plurality of HP prediction directions are calculated, where the prediction directions include three possible directions, i.e., a prediction from top, a prediction from left and a null prediction. Therefore, the step 430 further generates thereby coded metablock patterns corresponding to all the three prediction directions for storing. In step 420, the correct HP prediction direction is calculated according to lowpass coefficients (LPs) generated after two-stage lapped transform (LT) operations. In step 440, the coded metablock patterns corresponding to the three prediction directions generated in the step 430 are received, and the correct HP prediction direction is received such that a correct coded block pattern corresponding to the correct HP prediction direction can be selected. In step 450, an entropy coding on the HPs is performed according to the correct coded block pattern.

The present invention also provides an apparatus for generating a coded block pattern for highpass coefficients. In the embodiment, the apparatus includes a generator for generating numbers of non-zero coefficients of the metablocks, a coded metablock pattern generator, a coded block pattern register, an accumulator for accumulating numbers of non-zero coefficients of a macroblock, a decision circuit for deciding a HP prediction direction, a normalization parameter generator and two multiplexers.

The generator for generating the numbers of non-zero coefficients of the metablocks is used to calculate numbers of normalized non-zero HPs of the metablocks in all possible prediction directions. For the YUV_4:4:4 format, the HP prediction directions of the metablocks include a prediction from top, a prediction from left and a null prediction. Note that the following depiction is for explain, but does not limit, the present invention.

The coded metablock pattern generator receives three numbers of non-zero coefficients generated by the generator and generates coded metablock patterns corresponding to all the three prediction directions. In addition, the coded block pattern registers are used to register three possible coded block patterns of each metablock (corresponding to three possible directions) generated by the coded metablock pattern generator. The accumulator is used to accumulate the numbers of each of the three sets of numbers of non-zero coefficients generated by the generator of numbers of non-zero coefficients of the metablocks.

The decision circuit is used to receive the quantized LP signals. After the required LP signals are given, a correct HP prediction direction of the macroblock can be generated. One of the two multiplexers selects a correct coded block pattern for HPs registered in the coded block pattern registers according to the correct prediction direction generated by the decision circuit. Another multiplexer selects a correct set of numbers of non-zero HPs of the macroblock in the accumulator. The normalization parameter generator generates a set of HP normalization parameters for the successive macroblock according to the set of HP normalization parameters of the macroblock and the correct set of numbers of non-zero HPs of the macroblock, and the generated set of HP normalization parameters for the successive macroblock is for normalizing the HPs in the generator.

The above-described hardware apparatus for generating a coded block pattern for highpass coefficients is applicable to a codec in HD Photo format.

Figure 5:
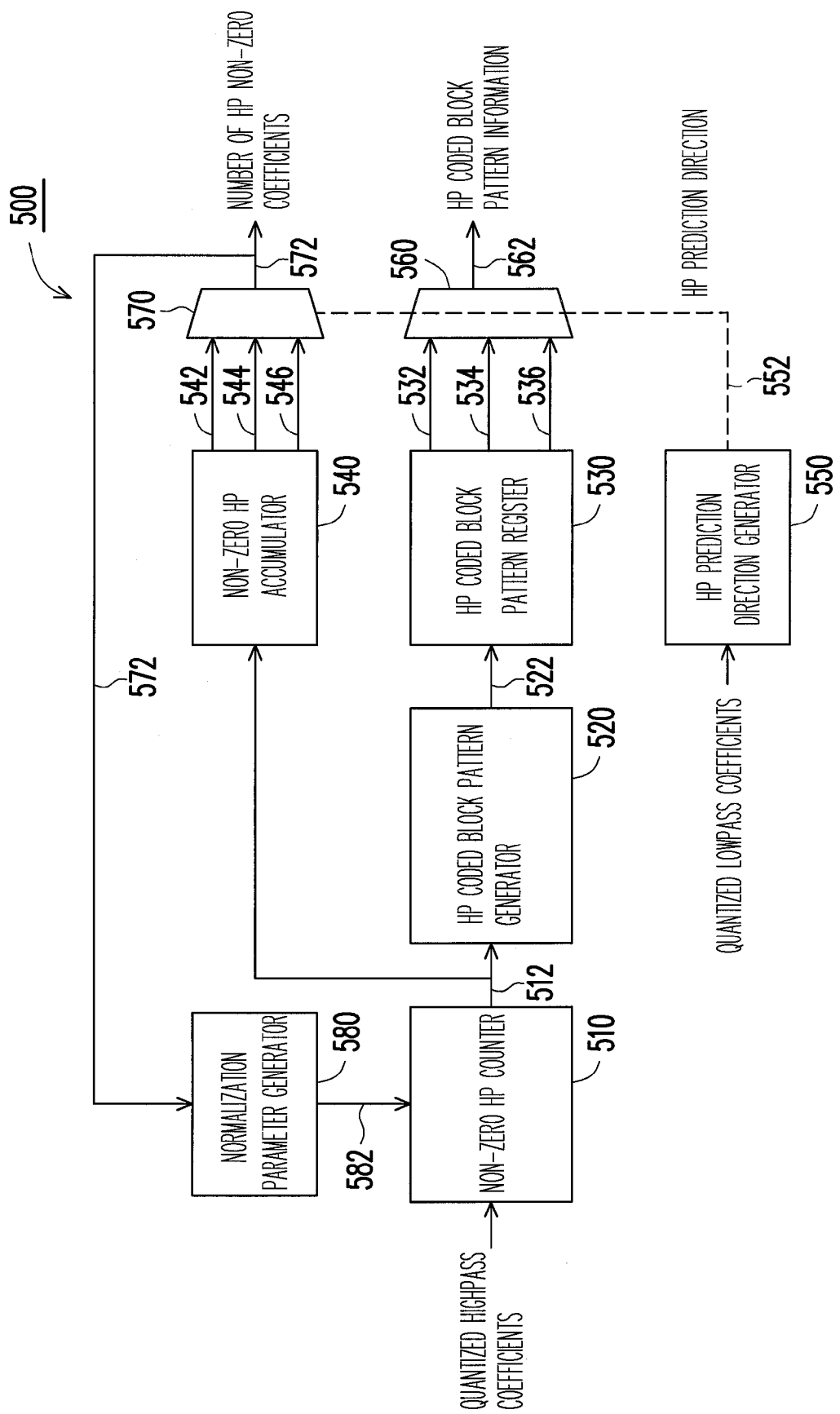
FIG. 5 is a block diagram of an apparatus for generating a coded block pattern for highpass coefficients according to an embodiment of the present invention.

FIG. 5 is a block diagram of an apparatus for generating a coded block pattern for highpass coefficients according to an embodiment of the present invention. Referring to FIG. 5, the circuit 500 herein targets the YUV_4:4:4 format and is used for generating a coded block pattern for highpass coefficients. The circuit 500 includes a generator for generating numbers of non-zero coefficients of the metablocks, a coded metablock pattern generator, a coded block pattern register, an accumulator for accumulating numbers of non-zero coefficients of macroblock, a decision circuit or a generator of HP prediction direction, a normalization parameter generator and two multiplexers.

The above-mentioned generator is a non-zero HP counter 510 for three different prediction directions of 4×4 blocks as shown in FIG. 5, which is the one used to calculate the numbers of non-zero coefficients of the 4×4 blocks in YUV_4:4:4 format corresponding to all possible HP prediction directions, wherein the possible prediction directions include a prediction from top, a prediction from left and a null prediction.

The coded metablock pattern generator is the HP coded block pattern generator 520 for three different prediction directions of 4×4 blocks, which is connected to the non-zero HP counter 510 for receiving a signal 512 output from the non-zero HP counter 510 so as to generate coded block patterns corresponding to three different prediction directions of 4×4 blocks and the coded block patterns are served as a signal 522 for output, where the signal 512 carries information indicating the numbers of non-zero coefficients corresponding to three possible prediction directions of 4×4 blocks generated by the generator of numbers of non-zero coefficients of the 4×4 blocks.

The HP coded block pattern register 530 is used to receive the signal 522, register the coded block patterns of the 4×4 blocks in the three different HP prediction directions and respectively deliver three signals 532, 534 and 536 corresponding to three different prediction directions to the input terminal of the multiplexer 560. The HP coded block pattern register 530 can be implemented by using an SRAM (static random access memory) or a plurality of flip-flops.

The accumulator for accumulating numbers of non-zero coefficients of macroblock is the non-zero HP accumulator 540 corresponding to three different prediction directions of the macroblock in FIG. 5 for accumulating the numbers of each of the three sets of numbers of non-zero coefficients generated by the non-zero HP counter 510 and respectively delivering three signals 542, 544 and 546 (i.e., the above-mentioned three accumulation results) corresponding to three different prediction directions to the input terminal of the multiplexer 570.

The decision circuit of HP prediction direction is the HP prediction direction generator 550 in FIG. 5 for receiving the quantized LP signals. After all the required LP signal are given, a correct HP prediction direction of the macroblock can be generated, which is served as a signal 552 to be delivered to the multiplexers 560 and 570.

The multiplexer 560 selects a correct coded block pattern for HPs registered in the coded block pattern register 530 according to the signal 552, i.e. the correct prediction direction generated by the HP prediction direction generator 550, wherein the correct coded block pattern is carried by a signal 562, and outputs the HP coding block pattern information 562. In addition, the multiplexer 570 selects a correct set of numbers of non-zero HPs from the macroblock in the non-zero HP accumulator 540 according to the correct HP prediction direction carried by the signal 552, and the selected correct set of numbers is outputted as the signal of "number of HP non-zero coefficients" 572.

The normalization parameter generator is the one marked as 580 in FIG. 5. The normalization parameter generator 580 receives the above-mentioned signal of number of non-zero HPs 572 and generates a set of HP normalization parameters for the successive macroblock according to the set of HP normalization parameters of the current macroblock and the signal of number of non-zero HPs 572. The generated set is output to the non-zero HP counter 510 and served as the base for the non-zero HP counter 510 to calculate the numbers of non-zero HPs for the successive macroblock.

Figure 6:
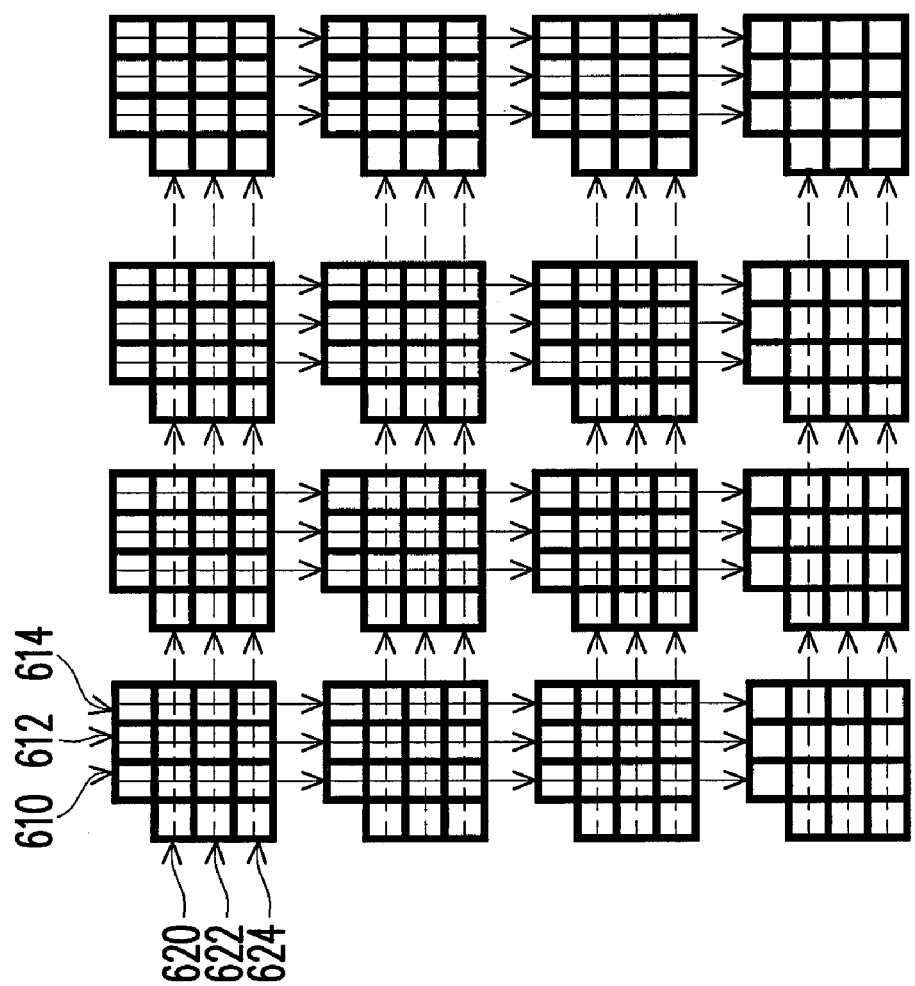
FIG. 6 is a diagram illustrating how to decide the highpass coefficient prediction directions of a picture in YUV_4:4:4 format.

For the YUV_4:4:4 format for example, the HP directions are predicted as shown in FIG. 6, where the prediction directions include a prediction from top, a prediction from left and a null prediction, wherein the prediction from top is marked by 610, 612 and 614, and the prediction from left is marked by 620, 622 and 624.

An embodiment for the YUV_4:4:4 format is described in more detail as follows. LTs of two stages are sequentially performed on Y, U and V. Whenever an LT of the first stage on a metablock is finished, the quantized HPs are input to the coded metablock pattern generator. The coded metablock pattern generator calculates the numbers of normalized non-zero coefficients of each the metablock corresponding to prediction from top, the prediction from left and the null prediction. The calculation result is output to the coded metablock pattern generator to obtain coded metablock patterns, meanwhile is output to the accumulator of numbers of non-zero coefficients of macroblock so as to accumulate the numbers of each of the sets of numbers of non-zero HPs of the macroblock, wherein the numbers are categorized into the numbers of non-zero coefficients corresponding to Y, the numbers of non-zero coefficients corresponding to U and the numbers of non-zero coefficients corresponding to V. The coded metablock patterns are registered in the coded block pattern register region. When LPs are obtained after finishing the LT of the second stage, the quantized LPs are input to the decision circuit of HP prediction direction so as to calculate the HP prediction direction. In the end, a correct coded block pattern and the set of numbers of non-zero HPs of the macroblock according to the correct prediction direction are selected. The set of numbers of non-zero coefficients of the macroblock is then input to the normalization parameter generator for generating a set of HP normalization parameters required by the successive macroblock, wherein the normalization parameters are categorized into normalization parameters for Y and normalization parameters for U and V.

According to the above-described spirit and concepts of the embodiment, the method and the apparatus for generating a coded block pattern for highpass coefficients can be easily used to YUV_4:2:2 format, YUV_4:2:0 format or other color formats.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for a processor to generate a coded block pattern for highpass coefficients, the method comprising:

the processor receiving a quantized highpass coefficient, wherein the highpass coefficient comprises a macroblock data and the macroblock data is divided into a plurality of block data;

the processor performing two-stage lapped transform operations on the block data and simultaneously calculating and obtaining a plurality of coded block patterns of the block data corresponding to a plurality of highpass coefficient prediction directions;

the processor performing a calculation to obtain selection information of the highpass coefficient prediction directions according to lowpass coefficients generated through the two-stage lapped transform operations; and the processor selecting a coded block pattern among the coded block patterns according to the selection information of the highpass coefficient prediction directions and outputting the selected coded block pattern.

2. The method for generating a coded block pattern for highpass coefficients according to claim 1, wherein calculating and obtaining the coded block patterns of the block data comprises:

obtaining a set of highpass coefficient normalization parameters of the macroblock;

calculating numbers of non-zero coefficients of the normalized highpass coefficients corresponding to the highpass coefficient prediction directions so as to generate a plurality of data of numbers of non-zero coefficients; and generating the coded block patterns corresponding to the highpass coefficient prediction directions according to the set of highpass coefficient normalization parameters of the macroblock and the numbers of non-zero coefficients corresponding to the highpass coefficient prediction directions.

3. The method for generating a coded block pattern for highpass coefficients according to claim 2, wherein the set of highpass coefficient normalization parameters of the macroblock is generated based on the set of highpass coefficient normalization parameters of a previous macroblock and the set of numbers of non-zero highpass coefficients of the macroblock.

4. The method for generating a coded block pattern for highpass coefficients according to claim 3, wherein the method of generating the set of numbers of non-zero highpass coefficients of the macroblock comprises:

accumulating a plurality of numbers of non-zero coefficients corresponding to the highpass coefficient prediction directions; and selecting one of the accumulated numbers of non-zero coefficients corresponding to the highpass coefficient prediction directions according to the selection information of the highpass coefficient prediction directions.

5. The method for generating a coded block pattern for highpass coefficients according to claim 1, wherein the macroblock data is subject to YUV_4:4:4 format and the highpass coefficient prediction directions comprise a prediction from top, a prediction from left and a null prediction.

6. The method for generating a coded block pattern for highpass coefficients according to claim 1, wherein the macroblock data is subject to YUV_4:2:2 format and YUV_4:2:0 format.

7. The method for generating a coded block pattern for highpass coefficients according to claim 1, wherein the highpass coefficient is a highpass coefficient in HD Photo format.

8. An apparatus, comprising:

a generator for generating a number of non-zero coefficients of a block, the generator receiving a quantized highpass coefficient and normalization parameters, wherein the quantized highpass coefficient comprise a macroblock data, and the macroblock is divided into a plurality of blocks, the generator is used to calculate the numbers of the non-zero coefficients in the normalized highpass coefficients corresponding to a plurality of highpass coefficient prediction directions of the blocks;

a coded block pattern generator receiving the numbers of the non-zero coefficients corresponding to the plurality of the highpass coefficient prediction directions so as to generate coded block patterns corresponding to different highpass coefficient prediction directions;

a coded block pattern buffer for temporarily storing the coded block patterns corresponding to the highpass coefficient prediction directions; and a decision circuit for receiving quantized lowpass coefficients and generating a selection signal according to the quantized lowpass coefficients for selecting one of the highpass coefficient prediction directions, and selecting one highpass coefficient coded block pattern corresponding to the selected highpass coefficient prediction direction among the highpass coefficient coded block patterns stored in the coded block pattern buffer.

9. The apparatus of claim 8, further comprising an accumulator for accumulating the numbers of the non-zero coefficients in the highpass coefficients of all the blocks of the macroblock after normalization in the highpass coefficient prediction directions, and generating thereby a plurality of sets of corresponding numbers of the non-zero highpass coefficients and selecting one of the sets of the numbers of the non-zero highpass coefficients according to the selection signal.

10. The apparatus of claim 9, further comprising a normalization parameter generator for receiving the set of the numbers of the non-zero highpass coefficients selected and output by the accumulator, generating a set of the highpass coefficient normalization parameters for the successive macroblock according to the set of the highpass coefficient normalization parameters and the set of the numbers of the non-zero highpass coefficients of the macroblock, and outputting the generated set of the highpass coefficient normalization parameters for the successive macroblock as the base for the generator of numbers of non-zero coefficients of the block to calculate the non-zero highpass coefficient coefficients.

11. The apparatus of claim 8, wherein the macroblock data is subject to YUV_4:4:4 format and the highpass coefficient prediction directions comprise a prediction from top, a prediction from left and a null prediction.

12. The apparatus of claim 8, wherein the macroblock data is subject to YUV_4:2:2 format and YUV_4:2:0 format.

13. The apparatus of claim 8, wherein the highpass coefficient is a highpass coefficient in HD Photo format.

* * * * *